US007747580B2

(12) United States Patent
Jain et al.

(10) Patent No.: US 7,747,580 B2
(45) Date of Patent: *Jun. 29, 2010

(54) DIRECT LOADING OF OPAQUE TYPES

(75) Inventors: Namit Jain, Emeryville, CA (US); Ellen Batbouta, Hollis, NH (US); Nipun Agarwal, Santa Clara, CA (US); Ravi Murthy, Fremont, CA (US); Paul Reilly, Nashua, NH (US); James Stenoish, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1201 days.

This patent is subject to a terminal disclaimer.

(21) Appl. No.: 10/648,577

(22) Filed: Aug. 25, 2003

(65) Prior Publication Data

US 2005/0050058 A1 Mar. 3, 2005

(51) Int. Cl.
*G06F 17/30* (2006.01)
(52) U.S. Cl. ..................................................... 707/679
(58) Field of Classification Search ................. 707/674, 707/678, 679
See application file for complete search history.

(56) References Cited

U.S. PATENT DOCUMENTS

| 6,085,198 A * | 7/2000 | Skinner et al. .......... 707/103 R |
| 6,115,705 A | 9/2000 | Larson |
| 6,360,302 B1 | 3/2002 | Baylor |
| 6,470,494 B1 * | 10/2002 | Chan et al. ................. 717/166 |
| 6,542,911 B2 | 4/2003 | Chakraborty et al. |

(Continued)

FOREIGN PATENT DOCUMENTS

EP 1 241 589 A2 9/2002

(Continued)

OTHER PUBLICATIONS

"SerialJavaObject (Java 2 Platform SE 5.0)". Available online at http://java.sun.com/j2se/1.5.0/docs/api/javax/sql/rowset/serial/SerialJavaObject.html, accessed Apr. 8, 2006. Copyright Sun Microsystems.*

(Continued)

*Primary Examiner*—Neveen Abel Jalil
*Assistant Examiner*—Mark Andrew X Radtke
(74) *Attorney, Agent, or Firm*—Hickman Palermo Truong & Becker LLP; Christian A. Nicholes

(57) ABSTRACT

Techniques and systems are disclosed for storing instances of an opaque type in a database according to a direct path loading approach. According to one aspect, an opaque type implementor registers, with a loader application, routines that the opaque type implementor implements. In response, the loader application associates the opaque type with the routines. The loader application reads data that comprises instances of the opaque type. The loader application determines which routines are associated with the opaque type. The loader application invokes the routines, which create an array for storing instances of the opaque type and populate the array with values specified in the data. The loader application converts the array into a data stream that conforms to the format of the database's data blocks. The loader application then streams the data to a database server, which writes the data directly into data blocks in the database.

4 Claims, 3 Drawing Sheets

U.S. PATENT DOCUMENTS

| | | |
|---|---|---|
| 6,654,761 B2 | 11/2003 | Tenev et al. |
| 6,662,342 B1 | 12/2003 | Marcy |
| 6,721,723 B1 | 4/2004 | Gibson et al. |
| 6,772,180 B1 | 8/2004 | Li et al. |
| 6,915,304 B2 | 7/2005 | Krupa |
| 6,915,307 B1 | 7/2005 | Mattis et al. |
| 6,941,511 B1 | 9/2005 | Hind et al. |
| 6,957,237 B1 | 10/2005 | Traversat et al. |
| 7,031,956 B1 | 4/2006 | Lee et al. |
| 7,036,072 B1 | 4/2006 | Sulisito et al. |
| 7,113,942 B2 | 9/2006 | Levanoni et al. |
| 7,134,072 B1 | 11/2006 | Lovett et al. |
| 7,406,522 B2 | 7/2008 | Riddle |
| 7,457,910 B2 | 11/2008 | Chang et al. |
| 2001/0049818 A1 | 12/2001 | Banerjia et al. |
| 2002/0056025 A1 | 5/2002 | Qiu et al. |
| 2002/0087596 A1 | 7/2002 | Lewontin |
| 2002/0116371 A1 | 8/2002 | Dodds et al. |
| 2002/0147763 A1* | 10/2002 | Lee et al. ............... 709/202 |
| 2002/0184188 A1 | 12/2002 | Mandyam et al. |
| 2003/0115421 A1 | 6/2003 | McHenry et al. |
| 2003/0120665 A1 | 6/2003 | Fox et al. |
| 2003/0140308 A1 | 7/2003 | Murthy et al. |
| 2004/0015936 A1* | 1/2004 | Susarla et al. ............ 717/166 |
| 2004/0066529 A1 | 4/2004 | Wu et al. |
| 2004/0088415 A1 | 5/2004 | Chandrasekar et al. |
| 2004/0117359 A1* | 6/2004 | Snodgrass et al. ............ 707/3 |
| 2005/0050092 A1 | 3/2005 | Jain et al. |
| 2005/0050105 A1 | 3/2005 | Idicula et al. |
| 2006/0036935 A1* | 2/2006 | Warner et al. ............ 715/500 |
| 2006/0047717 A1 | 3/2006 | Pereira |
| 2006/0200439 A1 | 9/2006 | Bhatia et al. |
| 2007/0005624 A1 | 1/2007 | Wu et al. |

FOREIGN PATENT DOCUMENTS

| | | |
|---|---|---|
| JP | 60-218142 | 10/1985 |
| JP | 2-165353 | 6/1990 |
| JP | 8-249159 | 9/1996 |
| WO | WO 01/42881 A2 | 6/2001 |

OTHER PUBLICATIONS

"10.1. What is the Direct Path?" from Oracle SQL Loader: The Definitive Guide. Published by O'Reilly & Associates, 2001.*

"Java programming dynamics, Part 2: Introducing reflection" by Dennis Sosnoski. Published Jun. 3, 2003. Available online at http://www-128.ibm.com/developerworks/library/j-dyn0603/.*

"Using Java Relection" by Glen McCluskey. Published Jan. 1998. Available online at http://java.sun.com/developer/technicalArticles/ALT/Reflection/.*

"Objects, Collections, and Opaque Types" from Oracle9i SQLJ Developer's Guide and Reference Release 2 (9.2).Copyright 1999, 2002. Available online at http://www.lc.leidenuniv.nl/awcourse/oracle/java.920/a96655/objcoll.htm.*

Shelley Higgins, Oracle Corporation, "Oracle9i, XML Database Developer's Guide—Oracle XML DB," Release 2 (9.2), Oct. 2002, Part No. A96620-02, pp. 1-1,044 (text provided on CD-ROM).

Ipedo, Inc., "Ipedo XML Database 3.1: Developer's Guide," 2001, XP-002306148, 12 pages.

Chris Parkerson, "Ipedo XML Database 3.1 Now Available," Jul. 22, 2002, XP-002306149, pp. 1-2.

Can Türker, "Schema Evolution in SQL-99 and Commercial (Object-) Relational DBMS," $9^{th}$ International Workshop on Foundations of Models and Languages for Data and Obejcts Fomlado/Demm 2000, Sep. 18, 2000, XP-002306150, pp. 1-32.

Hong Su et al., "XEM: XML Evolution Management," Jan. 2002, XP-002306151, pp. 1-32.

Yuan Wang et al., "X-Diff: An Effective Change Detection Algorithm for XML Documents," Proceedings of the $19^{th}$ International Conference on Data Engineering (ICDE'03), 2003, IEEE, pp. 519-530.

Awais Rashid, "A Framework for Customisable Schema Evolution in Object-Oriented Databases," Proceedings of the Seventh International Database Engineering and Applications Symposium (IDEAS'03), 2003, IEEE, 5 pages.

Xue Li, "A Survey of Schema Evolution in Object-Oriented Databases," 1999, IEEE, pp. 362-371.

International Search Authority, "Notification of Transmittal of the International Search Report and the Written Opinion of the International Search Authority, or the Declaration," Dec. 8, 2004, International Application No. PCT/US2004/027464, 14 pages.

"Current Claims of PCT/US2004/027464," pp. 1-7.

Japan Patent Office, "Notice of Ground of Rejection," with English translation, application 569332/2000, dated Apr. 27, 2005, 6 pages.

Riggs, Roger et al., "Pickling State in the Java™ System," XP002128178, 10 pages.

"Universal Data Option for Informix Dynamic Server," Informix Corporation, 1998, 8 pages.

Oracle, "Conventional and Direct Path Loads," Chapter 9 of Oracle 9i Database Utilities-Release 2 (9.2), Copyright 2002 Oracle Corporation, 29 pages.

Claims, International application No. PCT/US2006/045700, 2 pages.

European Patent Office, "Notification of Transmittal of the International Search Report and the Written Opinion of the International Searching Authority, or the Declaration", International application No. PCT/US2006/045700, dated Jul. 20, 2007, 12 pages.

Chakraborty, Krishnendu, et al., "The XML Garbage Collector", XP-002297849, The Source for Developers & Sun Developer Network Site, Technical Articles & Tips, dated Mar. 2002, 5 pages.

* cited by examiner

FIG. 2 200

202 OPAQUE TYPE IMPLEMENTOR REGISTERS, WITH A LOADER APPLICATION, ROUTINES THAT ARE IMPLEMENTED BY THE OPAQUE TYPE IMPLEMENTOR

204 LOADER APPLICATION ADDS, TO A DISPATCH TABLE, AN ENTRY THAT INDICATES AN ASSOCIATION BETWEEN THE ROUTINES AND AN OPAQUE TYPE THAT THE OPAQUE TYPE IMPLEMENTOR IMPLEMENTS

206 LOADER APPLICATION RECEIVES DATA OF AN OPAQUE TYPE

208 LOADER APPLICATION DETERMINES, FROM THE DISPATCH TABLE, WHICH ROUTINES ARE ASSOCIATED WITH THE OPAQUE TYPE

210 LOADER APPLICATION INVOKES THE ROUTINES

211 LOADER APPLICATION INVOKES ROUTINES TO DISCOVER THE STRUCTURE (NUMBER AND TYPES OF ATTRIBUTES) OF THE OPAQUE TYPE

212 ROUTINE CREATES AN ARRAY THAT COMPRISES A SEPARATE COLUMN FOR EACH ATTRIBUTE OF THE OPAQUE TYPE

214 ROUTINE POPULATES THE COLUMNS OF THE ARRAY WITH VALUES OF INSTANCES THAT ARE SPECIFIED IN THE DATA

216 LOADER APPLICATION GENERATES A DATA STREAM BASED ON THE ARRAY

218 LOADER APPLICATION STREAMS THE DATA TO A DATABASE SERVER

220 DATABASE SERVER WRITES THE DATA DIRECTLY INTO THE DATABASE

DIRECT LOADING OF OPAQUE TYPES

RELATED APPLICATIONS

The present application is related to the following U.S. Patent Applications, the entire contents of which are incorporated herein by reference for all purposes:

U.S. patent application Ser. No. 10/192,411, filed on Jul. 9, 2002, entitled OPAQUE TYPES, by Rajagopalan Govindarajan, Viswanathan Krishnamurthy, and Anil Nori;

U.S. patent application Ser. No. 10/260,138, filed on Sep. 27, 2002, entitled OPERATORS FOR ACCESSING HIERARCHICAL DATA IN A RELATIONAL SYSTEM, by Nipun Agarwal, Ravi Murthy, Eric Sedlar, Sivasankaran Chandrasekar and Fei Ge;

U.S. patent application Ser. No. 10/260,384, filed on Sep. 27, 2002, entitled PROVIIDING A CONSISTENT HIERARCHICAL ABSTRACTION OF RELATIONAL DATA, by Nipun Agarwal, Eric Sedlar, Ravi Murthy and Namit Jain;

U.S. patent application Ser. No. 10/259,278, filed on Sep. 27, 2002, entitled MECHANISM FOR MAPPING XML SCHEMAS TO OBJECT-RELATIONAL DATABASE SYSTEMS, by Ravi Murthy, Muralidhar Krishnaprasad, Sivasankaran Chandrasekar, Eric Sedlar, Vishu Krishnamurthy and Nipun Agarwal;

U.S. patent application Ser. No. 10/260,161, filed on Sep. 27, 2002, entitled INDEXING TO EFFICIENTLY MANAGE VERSIONED DATA IN A DATABASE SYSTEM, by Nipun Agarwal, Eric Sedlar and Ravi Murthy;

U.S. patent application Ser. No. 10/256,524, filed on Sep. 27, 2002, entitled MECHANISMS FOR STORING CONTENT AND PROPERTIES OF HIERARCHICALLY ORGANIZED RESOURCES, by Ravi Murthy, Eric Sedlar, Nipun Agarwal, and Neema Jalali;

U.S. patent application Ser. No. 10/259,176, filed on Sep. 27, 2002, entitled MECHANISM FOR UNIFORM ACCESS CONTROL IN A DATABASE SYSTEM, by Ravi Murthy, Eric Sedlar, Nipun Agarwal, Sam Idicula, and Nicolas Montoya;

U.S. patent application Ser. No. 10/256,777, filed on Sep. 27, 2002, entitled LOADABLE UNITS FOR LAZY MANIFESTATION OF XML DOCUMENTS by Syam Pannala, Eric Sedlar, Bhushan Khaladkar, Ravi Murthy, Sivasankaran Chandrasekar, and Nipun Agarwal;

U.S. patent application Ser. No. 10/260,381, filed on Sep. 27, 2002, entitled MECHANISM TO EFFICIENTLY INDEX STRUCTURED DATA THAT PROVIDES HIERARCHICAL ACCESS IN A RELATIONAL DATABASE SYSTEM, by Neema Jalali, Eric Sedlar, Nipun Agarwal, and Ravi Murthy;

U.S. patent application Ser. No. 10/648,600, filed on the same day herewith, entitled DIRECT LOADING OF SEMI-STRUCTURED DATA, by Namit Jain, Nipun Agarwal, and Ravi Murthy;

U.S. patent application Ser. No.10/648,749, filed on the same day herewith, entitled IN-PLACE EVOLUTION OF XML SCHEMAS, by Sam Idicula, Nipun Agarwal, Ravi Murthy, and Sivasankaran Chandrasekar; and U.S. patent application Ser. No. 10/648,497, filed on the same day herewith, entitled MECHANISM TO ENABLE EVOLVING XML SCHEMA, by Sam Idicula, Nipun Agarwal, Ravi Murthy, Eric Sedlar, and Sivasankaran Chandrasekar.

FIELD OF THE INVENTION

The present invention relates to database systems, and in particular, to techniques for directly loading data of an opaque type into a database.

BACKGROUND OF THE INVENTION

Structured data conforms to a type definition. For example, a type definition for a "person" type may define distinct attributes such as "name," "birthdate," "height," "weight," and "gender." Each "instance" of a particular type comprises a separate value for each of the attributes defined by the particular type. For example, an instance of the "person" type might comprise values such as "Fred Brown," "Jan. 1, 1980," "72 inches," "240 pounds," and "male." Each attribute is also of a type. For example, the "name" attribute might be of a "string" type, the "birthdate" attribute might be of "date" type, and the "gender" attribute might be of an "enumerated" type. Structured data might comprise multiple different instances of the same type.

Different approaches may be used to store structured data into a database. One such approach is called "conventional path loading." According to conventional path loading, a loader application parses structured data that comprises one or more instances of a type. Values within the structured data correspond to attributes of the type. The loader application generates Structured Query Language (SQL) commands, such as INSERT commands, that, when executed by a database server, cause the database server to insert the values into corresponding columns of a database table. Unfortunately, due to its heavy use of the SQL engine, conventional path loading often suffers in terms of performance and memory consumption.

Another approach for storing structured data into a database is called "direct path loading." Through direct path loading, values within structured data are stored directly into a database without causing the SQL engine to load each row of data. By consulting a control file that is associated with the structured data, a loader application with direct loading functionality can determine the types to which instances within the structured data conform. If the structures of the types are defined to the loader application, then, based on those structures, the loader application can create an array that comprises elements that correspond to the types' attributes. The loader application can populate each attribute's corresponding element with values that correspond to that attribute. Once the array is populated, the loader application can convert the array into a data stream that conforms to the format of a database's data blocks. The loader application then can stream the data to a database server, which can write the data directly into one or more data blocks in the database. Direct path loading exhibits performance superior to that of conventional path loading.

Some types indicated by a control file may be standard types that are defined to a loader application. A scalar type is an example of such a standard type. The loader application has information about the characteristics of a scalar type, such as the maximum storage size of a scalar type. With this information, the loader application can generate the data stream as described above.

However, some types indicated by a control file might not be among the types that are defined to the loader application.

A type indicated by a control file might have a structure that is defined only to a program that implements that type. Although the type might comprise attributes that are of standard types, the control file and the loader application might lack any information about the number or types of such attributes.

Without such information, the loader application cannot generate or populate an array that comprises a separate element for each such attribute. The loader application does not possess sufficient information to map values that correspond to such attributes to corresponding columns of a table in a relational database. Consequently, there is no effective way for the loader application to store instances of such a type in a database using the direct path loading approach.

Types that are not defined to a loader application are called "opaque types" relative to the loader application, because the internal structure of such types is unknown to the loader application. The internal structure of an opaque type, including the number and types of attributes of the opaque type, often is known only to a program that implements the opaque type. Such a program may be external to both the loader application and the database server.

It may not be practical to modify a loader application every time that a new opaque type is introduced, so that the new type is known and supported by the loader application. Additionally, the structures of some existing types may change as time passes. It may be impractical to modify a loader application every time that the structure of an existing type changes.

At present, loader applications are unable to use the direct path loading approach to store instances of opaque types other than as large objects (LOBs). Because the direct path loading approach exhibits performance superior to that of the conventional path loading approach, a technique is needed for storing instances of opaque types according to the direct path loading approach.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that illustrates a technique, according to an embodiment of the present invention, for storing instances of an opaque type in a database according to the direct path loading approach.

DETAILED DESCRIPTION OF THE INVENTION

Figure 1:
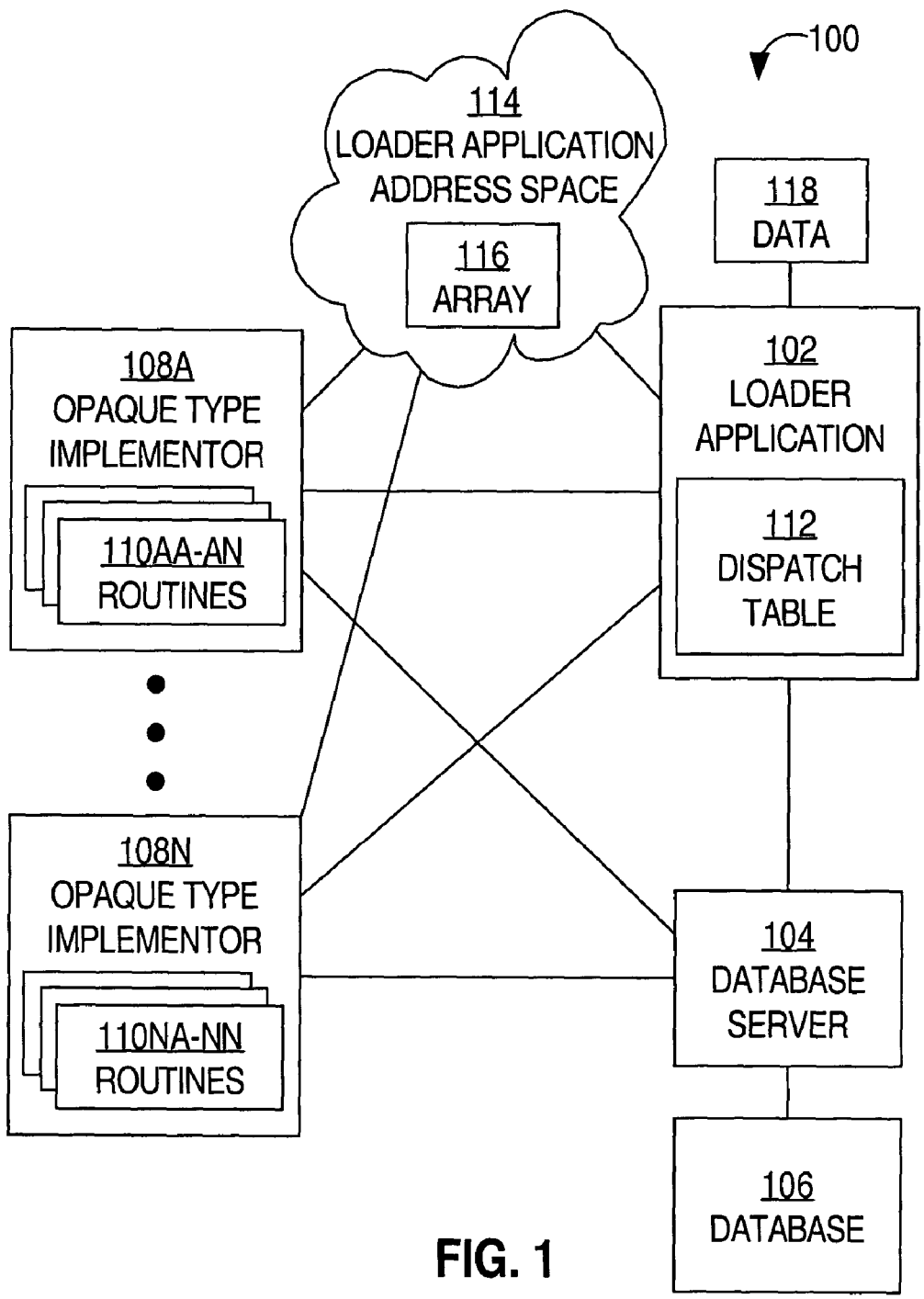
FIG. 1 is a block diagram that illustrates a system, according to an embodiment of the present invention, in which instances of opaque types may be stored in a database according to the direct path loading approach.

Techniques and systems are provided for storing instances of opaque types according to the direct path loading approach. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

It is desirable to store instances of opaque types in a database according to the direct path loading approach. According to one embodiment of the present invention, a program that implements an opaque type (an "opaque type implementor") registers, with a loader application, one or more routines that are associated with the opaque type. The opaque type implementor, which is external to both the loader application and a database server that manages the database, implements the routines. In response to the registration, the loader application adds an entry to a dispatch table. The entry indicates the association between the opaque type and the routines.

The loader application reads data that comprises instances of the opaque type. By consulting a control file that is associated with the data, the loader application determines that the instances are of the opaque type. The structure of the opaque type, the number of attributes of the opaque type, and the types of those attributes are not defined to the loader application. Therefore, the loader application locates, in the dispatch table, an entry that corresponds to the specified type. The entry indicates the association between the specified type and the routines that are implemented by the opaque type implementor.

The loader application invokes the routines. One or more of the routines tells the loader application the structure of (e.g., the number and types of attributes within) the opaque type. One or more of the routines creates an array for storing instances of the opaque type. The array comprises a separate element for each attribute of the opaque type. One or more of the routines populates the elements with values that are specified in the data. Each such value corresponds to a separate attribute of the opaque type. One or more of the routines stores each such value in the array.

With the array populated, the loader application converts the array into a stream of data that conforms to the format of the database's data blocks. The loader application then sends the stream of data to a database server, which writes this data directly into one or more data blocks in the database.

Thus, the loader application stores instances of the opaque type in the database according to the direct path loading approach. Because the direct path loading approach does not require the SQL engine to load each row of data, the direct path loading approach is faster and consumes less memory than the conventional path loading approach described above. Because opaque type implementors are external to both the loader application and the database server, instances of new opaque types can be stored in the database without modifying either the loader application or the database server as long as the opaque type implementor registers the routines.

The code that implements the routines that are associated with a particular opaque type is centralized within the particular opaque type's implementor rather than being distributed among multiple separate programmatic components. Such centralization promotes savings in terms of time and money.

Example System for Directly Loading Opaque Type Instances

FIG. 1 is a block diagram that illustrates a system 100 in which instances of opaque types may be stored in a database according to the direct path loading approach, according to an embodiment of the present invention. System 100 comprises a loader application 102, a database server 104, a database 106, and opaque type implementors 108A-N. Loader application 102, database server 104, and opaque type implementors 108A-N are coupled communicatively to each other. Database server 104 is coupled communicatively to database 106.

Loader application 102 reads or otherwise receives data 118 as input. Data 118 comprises instances of an opaque type. Data 118 also comprises an identity of the opaque type. For example, data 118 may be in the form of a control file. Data 118 does not indicate the structure of the opaque type. The structure of the opaque type is not defined to loader application 102.

Based on data 118, loader application 102 determines the identity of the opaque type to which the instances conform. Loader application consults dispatch table 112 to find, within the dispatch table, an entry that indicates the routines registered by the opaque type implementor. Dispatch table 112 comprises a separate entry for each of opaque type implementors 108A-108N. Each entry contains memory addresses of routines that are implemented by the opaque type implementor that implements the opaque type that is indicated by that entry. Table 1 below depicts an example of entries within a dispatch table.

TABLE 1

EXAMPLE DISPATCH TABLE ENTRIES

| OPAQUE TYPE IDENTITY | ADDRESSES OF ROUTINES |
|---|---|
| Identity of opaque type implemented by opaque type implementor 108A | Address of routine 110AA <br> * <br> * <br> * <br> Address of routine 110AN |
| * <br> * <br> * | * <br> * <br> * |
| Identity of opaque type implemented by opaque type implementor 108N | Address of routine 110NA <br> * <br> * <br> * <br> Address of routine 110NN |

The entries in dispatch table are added by loader application 102 in response to opaque type implementors 108A-N registering routines 110A-110NN with the loader application. Each opaque type implementor provides loader application 102 with the information needed to add an entry for the type implemented by that opaque type implementor. For example, opaque type implementor 108A may load routines 110AA-AN into locations in memory, and then specify those locations to loader application 102.

In response to finding, in dispatch table 112, an entry that indicates the identity of the opaque type, loader application 102 invokes the routines located at the memory addresses indicated by the entry. For example, if the opaque type is implemented by opaque type implementor 108A, then loader application 102 invokes routines 110AA-110AN.

One or more of the invoked routines tells loader application 102 the number of attributes for the opaque type. One or more of the invoked routines creates an array 116 in loader application address space 114. Loader application address space 114 comprises a segment of memory allocated for use by loader application 102. Array 116 comprises a separate element for each attribute of the opaque type.

One or more of the invoked routines populates the elements of array 116 with values within instances that are specified in data 118. Each such value corresponds to a separate attribute of the opaque type. Loader application 102 may pass such values as parameters to one or more of the invoked routines. For example, for each instance specified within data 118, loader application 102 may pass a single block of combined values, which represent that instance, as a parameter to one or more routines. The one or more routines may parse the block of combined values to produce separate values that correspond to the separate attributes of the opaque type.

One or more of the invoked routines stores the values in corresponding elements of array 116. Each row of array 116 stores values for a different instance specified in data 118. One of more the invoked routines returns, to loader application 102, one or more pointers to one or more addresses within loader application address space 114 at which one or more populated rows of array 116 can be found. Using the one or more pointers, loader application can locate and read the populated rows of array 116.

Based on the populated rows of array 116, loader application 102 generates a stream of data. The stream of data conforms to the format of data blocks within database 106. As a result, the stream of data generated by loader application 102 may be written directly to data blocks in database 106 without causing the SQL engine to load each row of data. Loader application 102 streams the data to database server 104. Database server 104 writes the data received from loader application 102 directly into one or more data blocks in database 106.

Memory Management

Because the amount of memory available in loader application address space 114 is limited, array 116 might not comprise enough rows to store, concurrently, values of all of the instances that are specified in data 118. Therefore, after a specified number of rows of array 116 have been populated, loader application 102 may read the populated rows, generate a stream of data based on those populated rows, stream the data to database server 104, and then invoke one or more of the routines indicated by the corresponding opaque type's entry to free the memory that the populated rows occupy. Once the memory has been freed, loader application 102 may again invoke one or more of the routines to generate array 116 and populate array 116 with values of additional instances for which a stream of data has not yet been generated. This process may be repeated until streams of data for all of the instances indicated in data 118 have been generated and streamed to database server 104.

Managing Nested Opaque Types

Memory management may be more complicated when an attribute of a type is an opaque type itself. For example, data 118 might comprise instances of a non-opaque type "A" that comprises two attributes: an attribute "B" of a scalar type and an attribute "C" of an opaque type "D" that is implemented by opaque type implementor 108A. In turn, opaque type "D" might comprise two attributes "E" and "F," both of scalar types.

In this example, the structure of type "A" is defined, at a high level, to loader application 102. Loader application 102 possesses sufficient information to generate, in loader application address space 114, an array (array "A") to store instances of type "A". Array "A" comprises an element (element "B") for attribute "B" and an element (element "C") for attribute "C."

Loader application 102 invokes one or more routines to find out that opaque type "D" has two attributes, "E" and "F." Loader application 102 populates rows of array "A" on a per-instance basis. Because attribute "B" is of a scalar type, loader application 102 may populate element "B" without invoking any external routines. Because attribute "C" is of an opaque type implemented by opaque type implementor 108A, loader application 102 invokes one or more of routines 110AA-AN for each instance of type "A." For each instance, loader application 102 passes a combined value block, which represents the value of attribute "C" for that instance, to the routines.

For each instance, the routines generate, in loader application address space 114, elements (elements "E" and "F") corresponding to attributes "E" and "F" of opaque type "D." For each instance, the routines populate elements "E" and "F" with corresponding values of attributes "E" and "F" separated out from the combined value block received as a parameter. For each instance, the routines return, to loader application 102, a pointer to populated elements "E" and "F". Loader application 102 stores the pointer in element "C" in the instance's corresponding row of array "A."

When loader application 102 generates a data stream for instances of type "A," it reads values on a per-instance basis from the memory structures described above. For each instance, loader application 102 reads a value stored in element "B," and a pointer stored in element "C." Following the pointer, loader application 102 reads a value stored in element "E," and a value stored in element "F."

Loader application 102 does not possess sufficient information about opaque type "D" to free memory that stores instances of opaque type "D." Therefore, when loader application 102 is going to free memory that stores values for attribute "B," the loader application also invokes one or more of routines 110AA-AN to free memory that stores the corresponding values for attributes "E" and "F."

When loader application 102 is going to free memory that contains a pointer to elements "E" and "F", the loader application passes the pointer as a parameter to one or more of routines 110AA-AN. Those routines then free the memory to which the pointer points. Loader application 102 does not free the memory that stores the pointer until the loader application invokes the routines that free the memory to which the pointer points.

Example Routines Implemented by an Opaque Type Implementor

Loader application 102 may invoke different routines to perform different functions relative to an opaque type. For example, each of routines 110AA-AN may perform a different function relative to an opaque type implemented by opaque type implementor 108. Such functions may include:

Allocating and initializing a general context block;
Indicating a type of a database table in which instances of the opaque type are to be stored;
Indicating the number of columns in a database table in which instances of the opaque type are to be stored;
Indicating types of columns in a database table in which instances of the opaque type are to be stored;
Initializing a context for a database table in which instances of the opaque type are to be stored;
Allocating memory, in loader application address space 114, for one or more arrays to store values of instances of the opaque type;
Parsing combined value blocks and storing separated values into separate elements of one or more arrays;
Freeing memory that stores values of an instance of an opaque type;
Flushing existing populated memory structures to persistent storage;
Completing the direct path loading and freeing all memory that was allocated to perform the direct path loading; and
Aborting the direct path loading and freeing all memory that was allocated to perform the direct path loading.

Different routines may accept different parameters and return different results. Loader application 102 may invoke one or more of routines 110AA-110AN sequentially in an order designed to achieve the ultimate goal of storing instances of the opaque type in database 106 according to the direct path loading approach.

Error Management

Loader application 102 may specify actions to be performed when an error occurs during the performance of any of the techniques described herein. For example, when such an error occurs, loader application 102 may update an error counter value and determine whether the error counter value is greater than a specified threshold. Loader application 102 may indicate that the techniques currently being performed should continue, despite the errors, unless the error counter value is greater than the specified threshold. Loader application 102 may indicate that the techniques currently being performed, and techniques that will be performed thereafter, should be aborted if the error counter value is greater than the specified threshold.

It is desirable for routines 110AA-NN to handle errors in a way that is consistent with the way that loader application 102 handles errors. Therefore, according to one embodiment, loader application 102 passes memory addresses of error handling routines, which are implemented by the loader application, to routines 110AA-NN. When any of routines 110AA-NN determines that an error has occurred, that routine executes an error handling routine that is located at the specified memory address. Thus, if an error handling condition is satisfied during the execution of any of routines 110AA-NN, actions connected to the satisfaction of the condition will be performed just as if the condition had been satisfied outside of the execution of such a routine.

Example Technique for Storing Instances of an Opaque Type in a Database According to the Direct Path Loading Approach FIG. 2 is a flow diagram that illustrates a technique 200, according to an embodiment of the present invention, for storing instances of an opaque type in a database according to the direct path loading approach.

In block 202, an opaque type implementor registers, with a loader application, routines that are implemented by the opaque type implementor. For example, opaque type implementor 108A may register routines 110AA-AN with loader application 102.

In block 204, the loader application adds, to a dispatch table, an entry that indicates an association between the routines and an opaque type that the opaque type implementor implements. For example, loader application 102 may add, to dispatch table 112, an entry that indicates an association between routines 110AA-AN and the opaque type implemented by opaque type implementor 108A.

In block 206, the loader application receives data of an opaque type. For example, loader application 102 may read data 118, which may comprise a control file that indicates values of instances of the opaque type and the identity of the opaque type.

In block 208, the loader application determines, from the dispatch table, which routines are associated with the opaque type. For example, loader application 102 may determine, from dispatch table 112, that the opaque type is associated with routines 110AA-AN.

In block 210, the loader application invokes the routines. For example, loader application 102 may invoke routine 110AA to initialize a context block. Loader application 102 may invoke routine 110AB to determine a type of a database table that will store instances of the opaque type implemented by opaque type implementor 108A. Loader application 102 may invoke routine 110AC to determine how many columns are in the database table. Loader application 102 may invoke routine 110AD to determine the types of the columns in the database table. In block 211, the loader application invokes routines to find out the structure of (e.g., the number and types of attributes within) the opaque type.

In block 212, in response to its invocation, a routine of the opaque type implementor creates an array that comprises a separate element for each attribute of the opaque type. For example, when invoked, routine 110AE may create array 116 in loader application address space 114.

In block 214, in response to its invocation, a routine of the opaque type implementor populates the elements of the array with values of instances that are specified in the data. For example, when invoked, routine 110AF may populate the elements of array 116 with values of instances that are specified in data 118.

In block 216, the loader application generates a data stream based on the populated rows of the array. For example, based on populated array 116, loader application 102 may generate a data stream that conforms to the format of data blocks stored in database 106.

In block 218, the loader application streams the data to a database server 104. For example, loader application 102 may stream data to database server 104.

In block 220, the database server writes the data directly into one or more data blocks in the database. For example, database server 104 may write data received from loader application 102 directly into one or more data blocks in database 106.

Thus, instances of an opaque type may be stored in a database according to the direct path loading approach. As discussed above, the direct path loading approach is faster and consumes less memory than the conventional path loading approach. Using the techniques and systems described above, instances of new opaque types can be stored in a database without modifying either the loader application or the database server.

Hardware Overview

Figure 3:
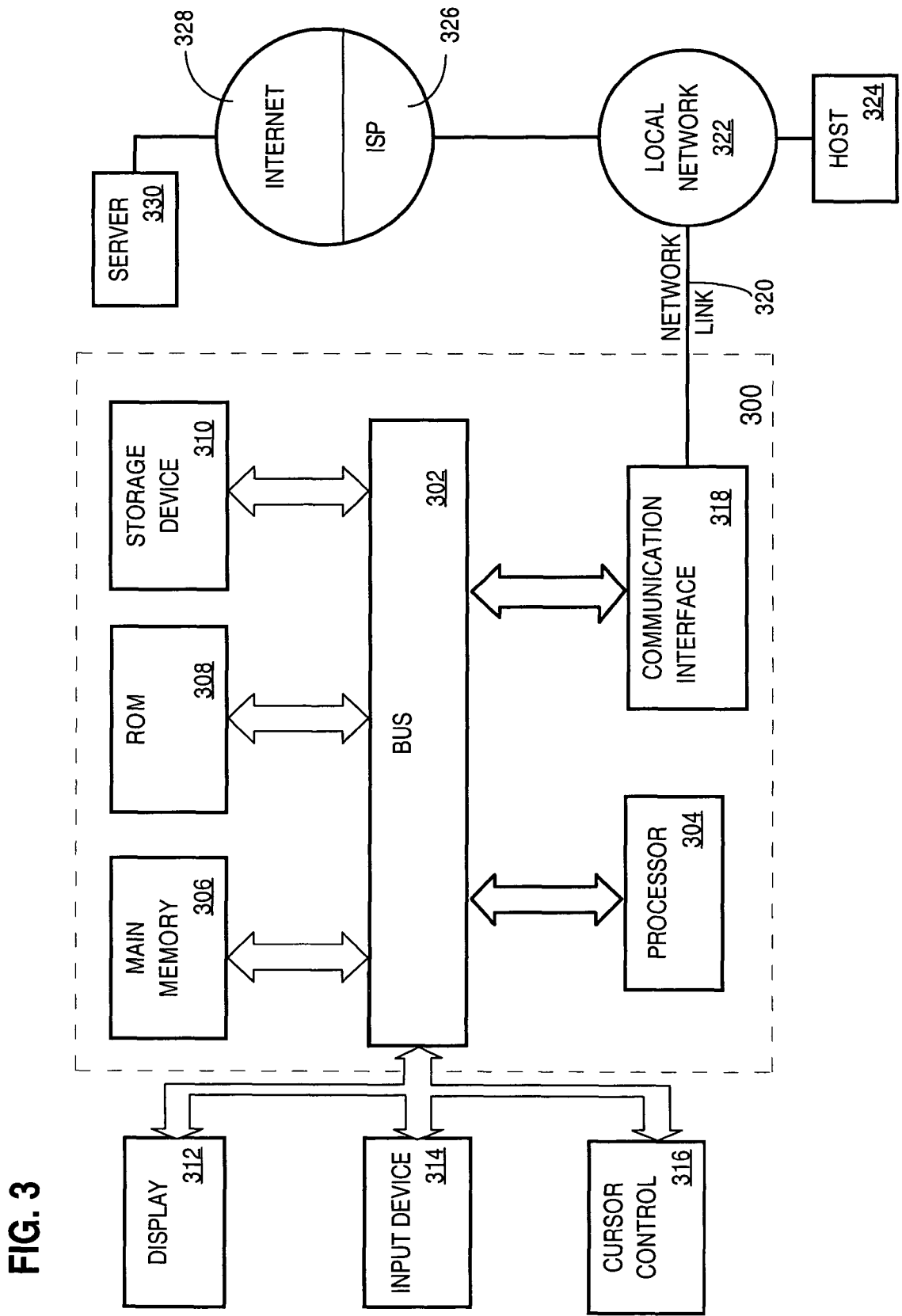
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of storing data into a database, the method comprising:
   a loader application receiving data;
   determining one or more routines that are associated with a type of said data, wherein said one or more routines are implemented by a program that is external to both said loader application and a database server that manages said database;
   said program registering, with said loader application, said one or more routines, which are not implemented by said loader application;
   in response to said program registering said one or more routines with said loader application, said loader application adding, to a dispatch table, an entry that indicates an association between said one or more routines and an opaque type implemented by said program;
   invoking said one or more routines;
   in response to said one or more routines being invoked, said program performing steps comprising:
      creating a data structure that has one or more elements that correspond to one or more attributes of said type; and
      populating said one or more elements with one or more values that are specified in said data, wherein said one or more values correspond to said one or more attributes;
   generating, based on said data structure, a data stream that conforms to a format of data blocks of said database; and
   writing said data into one or more data blocks in said database.

2. A computer-readable storage medium carrying one or more sequences of instructions which, when executed by one or more processors, causes the one or more processors to perform the method recited in claim 1.

3. A method of storing data into a database, the method comprising:
   a loader application receiving data;
   determining one or more routines that are associated with a type of said data, wherein said one or more routines are implemented by a program that is external to both said loader application and a database server that manages said database;
   invoking said one or more routines;
   in response to said one or more routines being invoked, said program performing steps comprising:
      creating a data structure that has one or more elements that correspond to one or more attributes of said type; and
      populating said one or more elements with one or more values that are specified in said data, wherein said one or more values correspond to said one or more attributes;
   generating, based on said data structure, a data stream that conforms to a format of data blocks of said database; and
   writing said data into one or more data blocks in said database;
   wherein invoking said one or more routines comprises:
   said loader application invoking at least one of said one or more routines to find out (a) a number of one or more attributes within an opaque type and (b) one or more types of said one or more attributes within said opaque type; and
   said loader application invoking at least one of said one or more routines to populate, with values of instances of the opaque type, elements of an away that is stored in a memory space of said loader application.

4. A computer-readable storage medium carrying one or more sequences of instructions which, when executed by one or more processors, causes the one or more processors to perform the method recited in claim 3.

* * * * *

UNITED STATES PATENT AND TRADEMARK OFFICE
CERTIFICATE OF CORRECTION

| | | |
|---|---|---|
| PATENT NO. | : 7,747,580 B2 | |
| APPLICATION NO. | : 10/648577 | |
| DATED | : June 29, 2010 | |
| INVENTOR(S) | : Namit Jain et al. | |

It is certified that error appears in the above-identified patent and that said Letters Patent is hereby corrected as shown below:

On page 2, in column 1, under "Other Publications", line 6, delete "Relection"" and insert -- Reflection" --, therefor.

On page 2, in column 2, under "Other Publications", line 14, delete "Obejcts" and insert -- Objects --, therefor.

In column 1, line 19, delete "PROVIIDING" and insert -- PROVIDING --, therefor.

In column 12, line 59, in claim 3, delete "away" and insert -- array --, therefor.

Signed and Sealed this
Tenth Day of May, 2011

David J. Kappos
*Director of the United States Patent and Trademark Office*